United States Patent [19]

Bauer

[11] 4,354,805
[45] Oct. 19, 1982

[54] FLUID DYNAMIC ENERGY EXCHANGER

[76] Inventor: Peter Bauer, 13921 Esworthy Rd., Germantown, Md. 20767

[21] Appl. No.: 166,487

[22] Filed: Jul. 7, 1980

Related U.S. Application Data

[63] Continuation-in-part of Ser. No. 44,656, Jun. 1, 1979, which is a continuation-in-part of Ser. No. 25,714, Mar. 30, 1979.

[51] Int. Cl.³ .............................................. F04F 1/02
[52] U.S. Cl. ........................................ 417/54; 417/65
[58] Field of Search .................... 123/559; 417/64, 65, 417/53, 54, 240; 60/39.45

[56] References Cited

U.S. PATENT DOCUMENTS

3,016,066  1/1962  Warren ............................... 137/836
3,165,061  1/1965  Smith et al. ...................... 417/199 R
3,581,719  6/1971  Gau ..................................... 60/279 X

Primary Examiner—Robert E. Garrett
Assistant Examiner—Edward Look
Attorney, Agent, or Firm—Griffin, Branigan & Butler

[57] ABSTRACT

A gas-to-gas energy exchanger utilizing a commutator repetitively diverts a jet of a first pressurized gas between an energy exchange conduit and an exhaust outlet. Upon entering the energy exchange conduit, the first gas creates a pressure wave which traverses the conduit at sonic velocity and, in so doing, compresses a second gas in the conduit. The now pressurized second gas opens a first check valve and egresses through a primary outlet. When the first gas is diverted to the exhaust passage, a rarefaction wave is created in the energy exchange conduit and traverses the conduit at sonic velocity plus the velocity of the first gas still in the conduit. The energy exchange conduit length may be selected such that the rarefaction wave reaches the downstream end of the conduit before the previously entered slug of first gas to thereby prevent mixing of the first and second gases in the primary outlet; alternatively, the conduit length may be selected to permit any desired degree of such mixing. The rarefaction wave closes the first check valve and opens a second check valve which permits the second gas to enter the downstream end of the conduit. The rarefaction wave also reverses the flow direction of first fluid passed by the wave so that the first fluid is caused to flow back upstream in the conduit to be aspirated into the exhaust passage by the jet of first gas. The commutator is preferably a fluidic oscillator, but may be a mechanically driven device; in either case the frequency is selected to provide desired operation consistent with the conduit length. Two such commutators may be employed, operating in 180° phase relation, so that a constant flow of the second gas may be provided from half cycle to half cycle.

30 Claims, 28 Drawing Figures

FLUID DYNAMIC ENERGY EXCHANGER

CROSS-REFERENCE TO RELATED APPLICATION

This application is a continuation-in-part application of my U.S. patent application Ser. No. 44,656, filed June 1, 1979, which is a continuation-in-part of my U.S. Patent Application Ser. No. 25,714, filed Mar. 30, 1979, both applications bearing the title "FLUID DYNAMIC ENERGY EXCHANGER".

TECHNICAL FIELD

The present invention relates generally to an improved method and apparatus for exchanging energy between two fluids and has particular use for supercharging an internal combustion engine, such as a diesel engine. In a specific embodiment, the invention relates to improvements in supercharging whereby most of the problems associated with state of the art superchargers are eliminated or significantly minimized.

BACKGROUND ART

A commercially successful supercharger arrangement for diesel engines to date is the type generally referred to as an aerodynamic wave machine and described in German Pat. No. 485,386 (1929) and Swiss Pat. No. 225,426 (1946). The basic principle of that supercharger is the transfer of pressure energy from the high pressure engine exhaust gas to low pressure air which is then delivered at high pressure back to the engine air intake manifold. The wave machine includes a cylindrical chamber in which there is located a rotor with multiple radial vanes, the rotor being driven from the engine by means of a belt drive arrangement. Openings are provided at the cylinder ends at appropriate locations to effect ingress and egress of fluid to and from the chamber. In operation, atmospheric air, present in each space between adjacent rotating vanes, experiences a pressure wave when that space passes an inlet opening at one of the chambers to which the high pressure engine exhaust gas is directed. The compression wave, moving at the speed of sound, compresses the air in the space as the wave passes by. The compressed air behind the wave occupies less space than before, permitting the engine exhaust gas to enter into the space between the vanes. As the compression wave reaches the opposite end of the cylinder, the vanes in question pass an outlet opening in that end which permits the compressed air to egress to the engine intake. By the time the compression wave reflects back toward the exhaust gas supply end of the chamber, the vanes have moved past the exhaust gas supply opening. Eventually the still slightly pressurized exhaust gas is permitted to egress from another chamber opening to ambient as the vanes pass the latter opening. A still further opening admits air into the space between the vanes before the rotation cycle is completed.

The aforementioned wave machine thus serves as a supercharger for the engine by utilizing the pressurized hot engine exhaust gases to pressurize the cold air delivered to the engine. The system is relatively efficient and has been used for a number of years. Nevertheless, there are some problems associated with the wave machine which have served as limiting factors on its increased utilization. Specifically, the wave machine requires additional controls during cold engine start up conditions because the exhaust gas flows straight through the machine to the engine intake under low engine rpm conditions. These controls usually take the form of a manually-operated choke-like arrangement which moves a butterfly valve or the like in position to admit air into the engine from a source other than the wave machine. In addition, the wave machine has a rotor arrangement which is subject to temperature variations on the order of 800° C., thereby limiting the choice of materials that can be used while maintaining the critical dimensional tolerances necessary to keep the engine operating. Further, because of the complex moving parts and their critical tolerances, wear and tear and a continuing need for lubrication present significant problems. Still further, because of the need for special materials and the relative complexity of the machine, cost becomes a problem, particularly when the machine is used in conjunction with a passenger vehicle. Another problem relates to the fact that the wave machine must be mechanically driven by the engine, resulting in operation over a wide range of rotating frequencies, some of which result in highly inefficient operation and power loss. The need to drive the wave machine from the engine also subjects the engine to being smothered by its exhaust gas if a drive belt breaks and also requires the wave machine to be located near the engine which often presents a severe space problem to a vehicle designer.

There have been attempts in the prior art to provide gas energy exchangers which eliminate the aforesaid problems of the aerodynamic wave machine. For example, in German Pat. OS No. 1,628,430 an energy exchange conduit is provided with externally-controlled valving at each end, the valving being timed to effect a specified sequence of gaseous ingress and egress into the conduit. Initially, gas in the conduit is compressed by admitting high pressure steam into one end. The opposite end is then opened to permit egress of the compressed gas, followed by opening of the first end to permit egress of the steam, now at a reduced pressure. The lower pressure steam still in the conduit expands permitting low pressure gas to be admitted through the opposite end, whereupon the cycle is repeated. This arrangement, while in some respects more advantageous than the aforesaid aerodynamic wave machine, introduces certain complexities which severely limit its practical utility, particularly in internal combustion supercharging applications. Specifically, this arrangement requires controlled valving at both ends of the energy exchange conduit and also requires some sort of accurate timing control external to the energy exchanger per se. The multiple valves, which must operate at high repetition rates and are subjected to wide temperature variations, are prone to failure, particularly when used in a supercharger application. The timing control is complex and also not well suited for automotive applications.

Another prior art gas energy exchanger is found in German Pat. No. AS 2,328,692. This arrangement utilizes one or more pairs of engine cylinders for each energy exchanger conduit. The pressurized exhaust gas from each cylinder, which flows as pulses in accordance with the combustion cycle of that cylinder, is split into two flows. One portion is fed to an energy exchange conduit wherein the pulse pressurizes air contained in the conduit. The other flow portion is directed through an ejector nozzle from which the flow aspirates spent exhauster gas from another energy exchange conduit associated with the other cylinder of the cylinder pair. The compressed air is forced through a check valve into a common inlet conduit for the cylinder pair. This inlet conduit has a check valve at either end, the valves being operated at different phases to permit alternate entry of pressurized air into the inlet conduit from respective energy exchange conduits of the cylinder pair. This arrangement also effects certain simplifications relative to the aforesaid aerodynamic wave machine; however, it, too, suffers from practical disadvantages which limit its commercial usefulness. In particular, the arrangement is workable only with an even number of engine cylinders, with each pair operating 180° out of phase with one another, thereby eliminating its application with three, five or seven cylinder diesel engines, or with engines of even numbered cylinders not having the desired phase relationship in cylinder operation. Further, there must be at least part of an energy exchange system provided for each pair of cylinders, thereby requiring duplication (or triplication or quadruplication) of valves, tubing, etc. for a given multi-cylinder engine. Still further, the high pressure exhaust gas pulses are derived directly from combustion in each individual cylinder. This presents wavelength matching problems since the particular conduit length is properly matched to the cylinder for only on engine speed. The wavelength mismatch results in loss of available energy and poor supercharging efficiency.

A still further approach toward solving the problems of the aerodynamic wave machine is found in Swiss Pat. No. 450613. In this arrangement the total pressurized exhaust gas flow from the engine is delivered to a fluidic oscillator wherein the exhaust gas flow is cyclically deflected so that it alternately flows into two energy exchange conduits. The pulse of exhaust gas entering each energy exchange conduit produces a pressure wave which traverses the air in that conduit, compressing the air as it passes. The compressed air is then forced into a supply tube for the engine air intake. An air aspiration inlet in the conduit permits air to be aspirated into the conduit behind the flowing exhaust gas slug passing the aspiration inlet. Thus, each energy exchange conduit receives air, has that air compressed by the pressure wave which runs ahead of the exhaust gas pulse, flows the compressed air back to the engine, and then causes the exhaust gas to egress via a separate path while aspirating fresh air into the conduit. The timing of these events is repetitive with the cycle in the two conduits being oppositely phased. This arrangement turns out to be totally impractical. For one thing, in order to divert the egressing compressed air into one outlet (i.e. the engine air intake) and the spent exhaust gas into another outlet (i.e. ambient), a second oscillator or other diverter is required in each of the two energy exchange conduits. This requires a large number of components, such as piping, tubing, etc., and also results in very large pressure losses. The large pressure losses occur because the flow experiences a pressure drop of approximately 50% through the fluidic element employed. Two fluidic oscillators in series, as used in this arrangement, results in a pressure loss of approximately 75%. Moreover, the air aspiration junction (connected in series), the forward control flow junctions or pick-offs (in series), and the open-to-ambient compressed air recombination junction for the two conduits all cause further pressure losses, of approximately 75%. As a result, the pressure recovery of the arrangement is only on the order of 1/16th of the exhaust gas energy applied to the system. In addition, further pressure losses are experienced due to shock waves created at supersonic flow regimes at junctions in the system.

Apart from these serious drawbacks to the system of Swiss Pat. No. 450,612, there are still other drawbacks. For example, the air aspiration junctions can be configured for effectiveness over only a narrow range of exhaust gas flow conditions; this presents a problem since the exhaust gas outflow from the engine and into the system varies a great deal. Moreover, there are extremely critical timing problems involved in properly operating the system, which problems are not considered in the patent. Specifically, the diverters must be synchronized to the oscillator in a way which eliminates mixing of the compressed air and exhaust gas. This synchronization problem is exacerbated in the supersonic flow regime which usually results in irregular flow conditions, particularly at flow passage discontinuities such as branches, junctions, etc. Since there are two interfaces between the exhaust gas and air for each pulse, the timing problems become all the more crucial if one is to avoid mixing exhaust gas with the air delivered to the engine air intake. In general then, this system is nothing more than a paper design having no practical application.

It is therefore an object of the present invention to provide a gas energy exchanger which avoids the cost and complexity factors of the aforesaid aerodynamic wave machine yet which is practical and useful over a wide range of pressurized gas flows. It is another object to provide such an energy exchanger which has a minimum number of parts and does not require critical material or tolerances. A still further object of the present invention is to provide a gas energy exchanger in which the disadvantages of the aforementioned prior art are avoided.

DISCLOSURE OF THE INVENTION

In accordance with one embodiment of the present invention, two oppositely phased commutators, such as fluidic oscillators, connected in parallel, receive the high pressure exhaust gas from an engine and deliver the resulting gas jet pulsedly to respective energy exchange conduits. Entry of a gas pulse into the conduit creates a pressure wave which traverses the conduit while compressing air therein as it passes. A bifurcated junction at the opposite end of the conduit includes a simple check valve in each path. A first valve responds to the compressed or pressurized air by opening and permitting the air to egress to the engine air intake. The second valve closes at this time. When the oscillator switches states, whereby the exchaust gas is directed into an exhaust channel, a rarefaction wave enters the conduit and begins traversing the conduit at the speed of sound plus the velocity of the previously admitted exhaust gas. This rarefaction wave acts to reverse the direction of the exhaust gas as the wave passes through the conduit, resulting in aspiration of the exhaust gas into the exhaust channel by the flowing exhaust gas jet. Thus, the exhaust gas is caused to reverse flow direction in the energy exchange conduit by the dual action of the rarefaction wave and the aspirating exhaust jet. If it is desired to preclude exhaust gas from mixing with air directed into the engine air intake, the length of the conduit must be selected such that the rarefaction wave, travelling at the speed of sound plus the exhaust gas flow velocity, reaches the end of the conduit before the exhaust. Temperature variations in the exhaust gas, while changing the oscillator frequency, also change the velocity of sound in a similar manner so that the net result is that the rarefaction still reaches the end of the conduit before the exhaust gas if the conduit is sized between one-half and one-quarter wavelength of the oscillator frequency. Upon reaching the end of the conduit, the rarefaction wave creates a negative pressure which opens the second check valve at the bifurcation. When opened, the second check valve admits atmospheric air into the conduit, which air is sucked in by the low pressure created by the rarefaction wave and the aspiration effect of the exhaust gas jet evacuates the spent exhaust from the conduit. The pressurized air forced from the two energy exchange conduits (one for each oscillator) are tied together. Since the oscillators are oppositely phased, air flow to the engine intake is continuous. Importantly, air and exhaust gas are separated without requiring a second fluidic diverter or other inefficient diverting mechanism. For certain applications it may be desirable that there be mixing of exhaust gas with air in the engine air intake; under such circumstances the oscillator frequency and conduit length are selected to permit the gas pulse to reach the end of the conduit before the rarefaction wave.

In a further embodiment, a single fluidic oscillator has three outlets, the two outer outlets serving as energy exchange conduits and the middle one serving as the exhaust outlet. Energy exchange proceeds in the two exchange conduits in alternation in the manner described above.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

BEST MODE OF CARRYING OUT THE INVENTION

Figure 1:
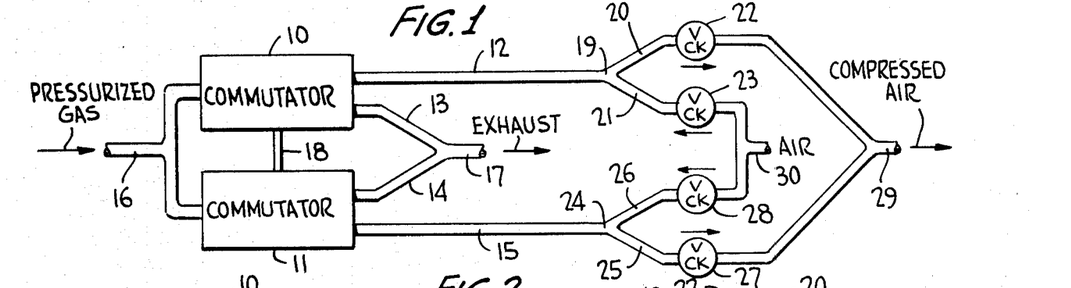
FIG. 1 is a block diagram of one embodiment of the energy exchanger of the present invention.

Referring specifically to FIG. 1 of the accompanying drawings, a pair of commutators 10 and 11 are each arranged to receive a pressurized gas and cyclically direct a jet of that gas into an energy exchange conduit and an exhaust conduit in alternation. More specifically, commutator 10 receives the pressurized gas from a flow conduit or passage 16 and alternately issues a jet of that gas into energy exchange conduit 12 and exhaust conduit 13. Likewise, commutator 11 receives the pressurized gas from conduit 16 and alternately issues its jet into energy exchange conduit 15 and exhaust conduit 14. Exhaust conduits 13 and 14 feed a common exhaust passage 17 which directs the exhaust gas to ambient or some other low pressure environment. The commutators are synchronized in 180° phase opposition at 18 in order that the jet from commutator 10 is directed into energy exchange conduit 12 when the jet from commutator 11 is directed to exhaust passage 14; likewise, the jet from commutator 10 is directed into exhaust passage 13 when the jet from commutator 11 is directed into energy exchange conduit 15. Commutators 10 and 11, theoretically, may be any self-driven (i.e. no external control) fluid flow commutating devices which perform the functions and operations described herein; however, in practice, I have found that fluidic oscillators, having no moving parts, are the most advantageous embodiments for the commutators. A number of embodiments of the present invention, employing both mechanical commutators and fluidic oscillators of different types, are described hereinbelow.

At the downstream end of energy exchange conduit 12 there is a bifurcation 19 from which passages 20 and 21 extend. Passage 20 includes a check valve 22 which permits flow only in a downstream direction (i.e. away from junction 19) and empties into a compressed air outflow passage 29. Passage 21 includes a check valve 23 which only permits flow in an upstream direction (i.e. toward junction 19) and receives ambient air from a supply passage 30. A similar bifurcation 24 at the downstream end of energy exchange conduit 15 branches off into passages 25 and 26. Passage 25 includes a check valve which permits only upstream flow of ambient air from supply passage 30. Importantly, check valves 22, 23, 27 and 28 are controlled entirely by the pressure conditions subsisting at the downstream ends of energy exchange conduits 12 and 15 and therefore require no external controls or timing circuitry.

Figure 9:
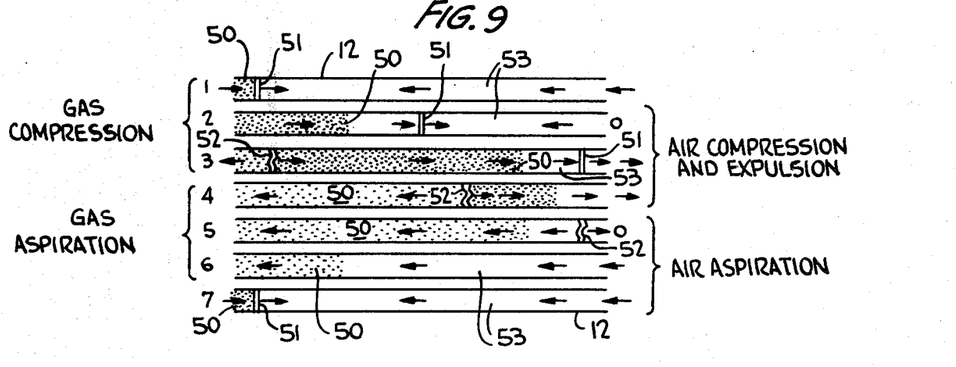
FIG. 9 is a combined schematic and timing diagram illustrating the operational sequence for the energy exchanger of the present invention.

Operation of the system of FIG. 1 is described in greater detail below with reference to the schematic diagrams of FIGS. 2 and 9. For present purposes, it is sufficient to state that each slug of pressurized gas which enters an energy exchange conduit (for example, conduit 12) results in a compression wave which travels down the length of the conduit at the speed of sound. Upon reaching bifurcation 19 the compression wave closes check valve 23, thereby blocking air entry via passage 30, and opens check valve 22, thereby permitting the now pressurized air to egress via passage 29. At the start of the next half cycle, when the jet of pressurized gas is directed into exhaust passage 13 from commutator 10, a rarefaction wave is initiated at the upstream end of conduit 12 and traverses that conduit at the speed of sound plus the flow velocity of the pressurized gas which entered conduit 12 during the previous half cycle. The rarefaction wave produces a negative pressure in the gas as the wave passes through, thereby causing the gas to reverse direction and flow back toward commutator 10. The reverse flowing gas is then aspirated by the pressurized gas jet directed into exhaust passage 13. In a preferred but not limiting operation mode, the rarefaction wave overtakes the leading edge of the gas slug in conduit 12 before the gas slug reaches junction 19, thereby assuring that all of the gas is caused to reverse its flow direction and be aspirated through exhaust passage 17 rather than flow out through valve 22 and passage 29 with the compressed air. When the rarefaction wave reaches the downstream end of conduit 12 a low pressure is developed in that region which closes valve 22 and opens valve 23. With valve 23 opened, air is admitted into the conduit from passage 29, the air being sucked into the conduit due to the evacuation therefrom of the spent gas by the aspiration action the jet directed into exhaust passage 13. When the pressurized jet switches back into conduit 12, the conduit 12 contains the ambient air which is compressed as the cycle repeats. A similar cycle ensues in energy conduit 15, however, the cycle in conduit 15 is 180° out of phase with the cycle in conduit 12. In this manner, air flow into passage 20 occurs continuously.

It is not always desirable that the pressurized gas be prevented from egressing through valve 22; that is, mixing of the gas with the compressed air may be desirable. This becomes a possibility in applications where the energy exchanger serves as a supercharger in which the pressurized gas is engine exhaust gas and the compressed air is delivered to the engine air intake.

Figure 2:
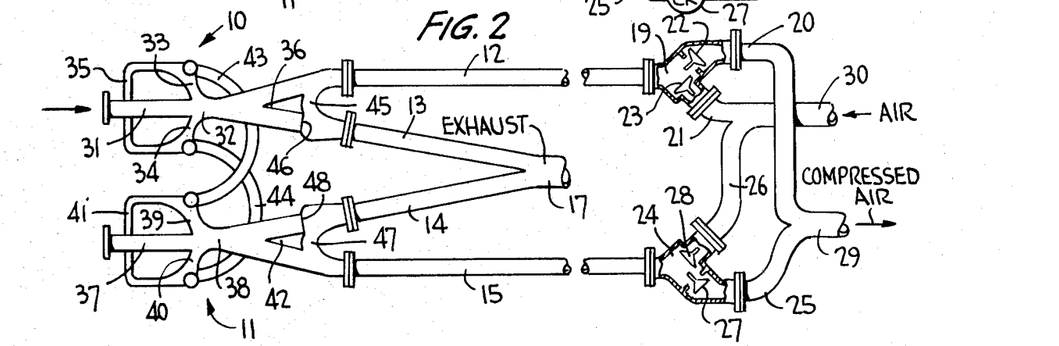
FIG. 2 is a schematic diagram of the embodiment of FIG. 1.

Referring next to FIG. 2, the energy exchanger of FIG. 1 is illustrated schematically and in greater detail. Like components in FIGS. 1 and 2 are designated by the same reference numerals. Commutator 10 comprises a fluidic oscillator of the general type described in U.S. Pat. No. 3,016,066. The oscillator includes a power nozzle 31 which receives the pressurized gas and issues a jet thereof into an interaction region 32, the downstream end of which is bifurcated by flow divider 36 to form two outlet passages. One outlet passage is energy exchange conduit 12; the other is exhaust passage 13. At the upstream end of the interaction region there are two control ports 33 and 34 disposed on opposite sides of the jet which is issued by nozzle 31. These control ports are interconnected by a passage 35. As is well known, oscillator 10 operates at a frequency substantially determined by the length of passage 35 and by the speed of sound in the applied pressurized gas. More specifically, the jet from nozzle 31 is initially directed at flow divider 36 and, because the jet is turbulent, slightly more gas flows to one side of the divider than the other in a random manner. Boundary layer attachment, otherwise known as the Coanda effect, causes the jet to be attracted to the sidewall corresponding to the predominant flow direction, thereby causing the entire jet to be attracted toward that sidewall and flow into one outlet passage (e.g., conduit 12). When so flowing, the jet efficiently aspirates fluid from the closer control port (for example, port 36), causing a rarefaction wave to traverse passage 35 from port 33 to port 34 at sonic speed. Simultaneously, a pressure wave travels at the speed of sound in the opposite direction. The rarefaction wave arrives at port 34 when the pressure wave arrives at port 33 and the combined effect is pressure differential across the jet which deflects to the opposite side of the interaction region from which it flows into exhaust passage 13. Now the rarefaction and compression waves reverse directions, traversing passage 35 at sonic speed and effecting jet deflection in the opposite direction. The cycle repeats and operation continues indefinitely.

Oscillator 11 includes similar components, namely power nozzle 37, interaction region 38, control ports 39, 40, passage 41 and flow divider 42. Operation proceeds in the same manner described in oscillator 10. In order to synchronize the two oscillators 10 and 11 in phase opposition, a first conduit 43 communicates between control port 33 of oscillator 10 and control port 39 of oscillator 11, while a second conduit 44 communicates between control port 34 of oscillator 10 and control port 40 of oscillator 11. Conduits 43 and 44 equalize the pressure conditions in the control ports they interconnect and thereby assure synchronization. With the connections described, the jet in oscillator 10 is directed into energy exchange conduit 12 while the jet in oscillator 11 is directed into exhaust passage 14.

In order to provide for efficient aspiration of fluid from conduit 12 by a gas jet directed into exhaust passage 13, an aspiration passage 45 extends between conduits 12 and 13 at a location slightly downstream of the leading edge of the flow divider. The aspiration passage 45 is curved concave facing downstream and facilitates flow of gas from conduit 12 into exhaust passage 13 under the aspiration action of the jet flowing into passage 13. In addition, passage 13 widens in all directions at location 46 which is proximate the entry of aspiration passage 45 into passage 13. This widened portion provides for more efficient aspiration since it exposes more surface area of the jet at the location 46 where aspirated gas joins the jet. A similar aspiration passage 47 and widened location 48 are provided in oscillator 11. It should be stressed that these aspiration-increasing expedients may not be necessary for all applications of the energy exchanger.

At the downstream ends of energy exchange conduits 12 and 15, the various check valves are schematically illustrated. It should be noted that, although not shown, such valves may include bias means, such as a spring or the like, for biasing the valves toward one position or the other and thereby establishing a threshold pressure for opening or closing the valve.

Operation of the apparatus of FIG. 2 proceeds in the manner described in relation to FIG. 1. A more detailed sequence of operation is illustrated in FIG. 9 wherein one of the energy exchange conduits 12 is illustrated for six sequential steps of the operating cycle. Initially, a pressure wave 51 is shown entering conduit 12 as a slug of the pressurized gas 50 enters the conduit. In the second time frame the pressure wave 51 is shown well ahead of the flowing pressurized gas 50, compressing the air 53 it passes and causing the compressed air to flow downstream behind the pressure wave. In the third time frame the pressure wave 51 is shown approaching the downstream end of the conduit and the rarefaction wave 52 entering the upstream end. The pressurized gas ahead of the rarefaction wave continues to flow downstream; however, pressurized gas behind the rarefaction wave is shown as reversing direction and flowing back upstream where it is aspirated into the exhaust channel. Since the rarefaction wave 52 moves through the gas 50 at sonic velocity plus the flow velocity of the gas 50, it quickly traverses conduit 12. In time frame 4 the rarefaction wave is shown approximately two-thirds of the way through the conduit with all of the gas ahead of the rarefaction wave still flowing downstream and all of the gas behind the wave flowing upstream. In time frame 5 the rarefaction wave is shown approaching the downstream end having passed the leading edge of the slug of gas 50. All of the remaining gas 50 in conduit 12 is flowing back upstream at this time. In addition, air 53 has begun entering the downstream end of the conduit and flows upstream to replace the evacuated gas 50. In time frame 6 there is neither a pressure wave nor a rarefaction wave in the conduit. The flow of the gas 50 and air 53 in the conduit is all upstream, with additional air still being admitted at the downstream end. The flow-creating force at work during this time frame is the aspiration effect created by the jet directed into exhaust passage 12. Things remain this way until the jet of gas 50 switches back into conduit 12 and initiates a pressure wave and another cycle of operation, as illustrated in time frame 1. It should be noted that, for engine supercharging applications, it is not critical to prevent air from being aspirated into the exhaust passage 13. Therefore, it is not necessary that the jet be switched from passage 13 into conduit 12 before air 53 reaches the upstream end. This switching can occur whether or not there is still some gas 50 remaining in conduit 12. However, it is important, for efficient operation, to make sure that if gas 50 flows into the compressed air passage 29 and on to the engine air intake, this gas flow is precisely controlled. Specifically, it is conventional to feed back some engine exhaust gas for purposes of reducing pollution and increasing efficiency. It is for this reason that the length of conduits 12 and 15 are chosen with a view toward the nominal operating frequency of oscillators 10 and 11 to obtain the desired mixture, or lack thereof, of air and exhaust gas. Temperature changes of the fluid will affect the frequency because sonic velocity varies with temperature. However, the sonic velocity component of the wave velocities also change with temperature and therefore temperature dependent frequency changes will not upset the synchronization of the times when rarefaction wave and the leading edge of the gas slug reach the downstream end of conduits 12, 15.

A different approach to understanding the basic conditions ocurring in conduits 12 and 15 is illustrated in FIGS. 15 through 18. The various vectors shown in these timing graphs reprsent various flow and pressure fronts in the energy exchange conduit and are schematically illustrated in a very simplified form for purposes of understanding. The simplification omits multiple reflections and their effects on propagation velocities and neglects the fact that the propagation velocities are not necessarily constant along the conduit length. That is, conditions such as temperature, etc., affect velocity and would render the illustrated straight line vectors curved.

Figure 15:
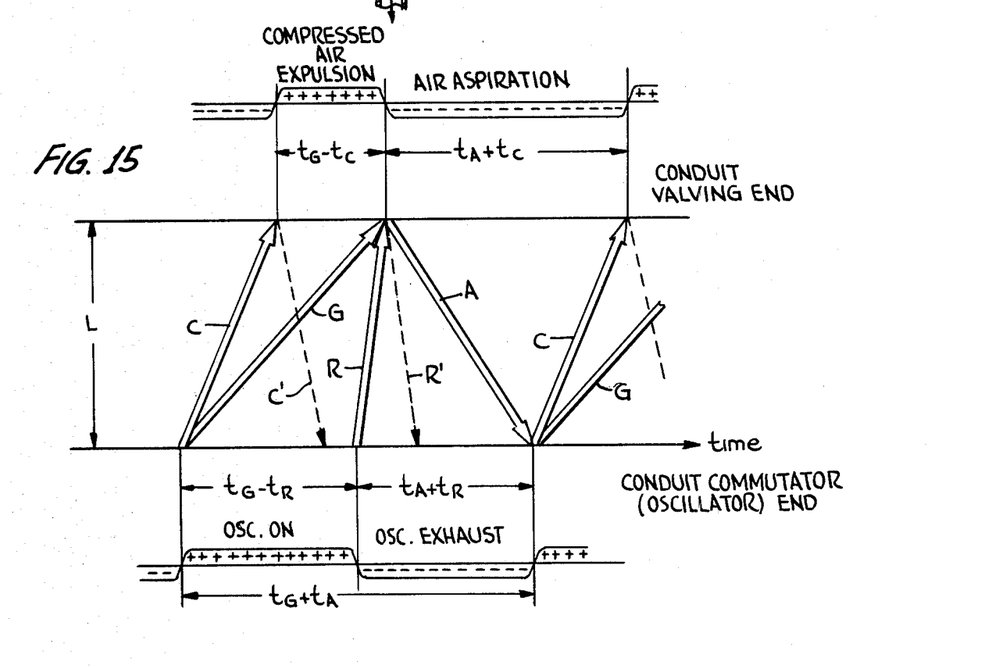
FIGS. 15, 16, 17 and 18 are schematic timing diagrams illustrating flow and pressure conditions occurring in sequence for respective operating modes of the present invention.

FIG. 15 illustrates a fifty percent duty cycle; that is, the oscillator jet is directed into the exhaust conduit and energy exchange conduit for equal portions of each oscillator cycle.

A gas flow front G enters the conduit and produces a compression front C. Front C propagates through the conduit of length L at the speed of sound in the conduit-contained air minus the air velocity:

$$v_c = c_s - v_a \tag{1}$$

wherein $v_c$ is propagation velocity of front c, $c_s$ is the speed of sound in the air in the conduit, and $v_a$ is the velocity of air in the conduit. The gas flow front G propagates through the conduit initially at gas flow velocity $v_g$. For the case wherein only air is to be expelled from the conduit (i.e. at about the time of arrival of the gas flow front at the valving, pressure conditions there have to be such that air aspiration is induced and gas flow is reversed), the oscillator must provide rarefaction front R into the conduit at such a time that this rarefaction front R arrives at the valving simultaneously with the gas flow front G. Front R propagates through the conduit at a velocity:

$$v_R = C_g + v_g \tag{2}$$

wherein $v_R$ is the velocity of front R, $C_g$ is the velocity of sound in the exhaust gas and $v_g$ is the velocity of the gas.

On arrival of R at the valving, air is aspirated through the respective check valve into the conduit, wherein it flows at velocity $v_a$. Once the air flow fron A reaches the oscillator end of the conduit, the above indicated cycle repeats itself.

FIG. 15 shows the described events in dependence on time together with the respective oscillator and valving operation cycles. Dotted lines indicate first reflections of the compression and rarefaction fronts respectively. From this simplified schematic one can draw conclusions as to fundamental relationships. Specifically, the oscillation cycle period is equal to the time $t_G$ required for the gas flow front G to traverse the conduit plus the time $t_A$ required for the air flow front A to traverse the conduit in the opposite direction (or $t_G + t_A$). The time during which the oscillator jet is directed into the energy exchange conduit is $t_G$ minus the time required for the rarefaction front R to traverse the conduit ($t_G - t_R$). The time during which the oscillator jet is directed into the exhaust passage is $t_A + t_R$. The time during which air is expelled from the energy exchange conduit is $t_G$ minus the time required for the compression front C to traverse the conduit (or $t_G - t_C$). The air aspiration interval from the conduit is given by $t_A + t_C$. The dashed vector lines C' and R' represent the reflected compression front and reflected rarefaction front, respectively. As noted above, for purposes of simplification in understanding, the effects of these reflected fronts are not considered in the description but it should be noted that, in some cases, their contribution may be considerable.

Figure 16:
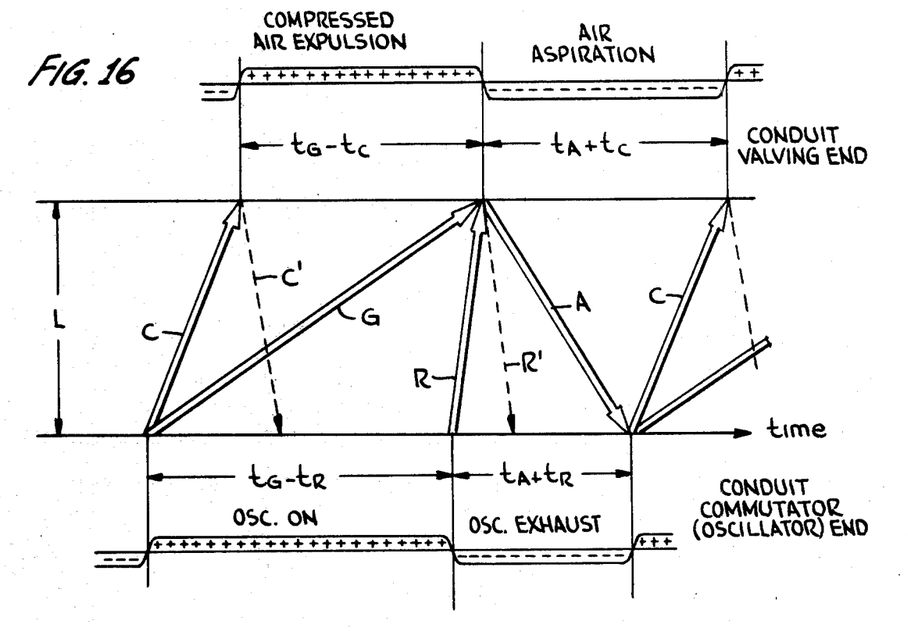

With respect to the fifty percent duty cycle illustrated in FIG. 15, the expulsion of air (interval $t_G - t_C$) must occur for less than one-half of the overall cycle time ($t_G + t_A$) because rarefaction front R moves at a higher speed through the conduit than the compression wave C. That is to say, $t_R$ is less than $t_C$ so that $t_G - t_R$ must be longer than $t_G - t_C$. If it is desired to obtain equal intervals or air expulsion ($t_G - t_C$) and air aspiration ($t_A + t_C$), as illustrated in FIG. 16, the oscillator duty cycle must be unbalanced with the oscillator "on" portion (i.e. flow into the energy exchange conduit) longer than the "off" portion. The same imbalance in duty cycle would be required to provide an air expulsion interval greater than the air aspiration interval.

It should be noted from FIG. 15 that a fifty percent oscillator duty cycle is achieved therein with the rarefaction front R reaching the end of the energy exchange conduit at precisely the same time as the gas flow G. To change this duty cycle, the easiest parameter to vary is the gas flow rate applied to the oscillator.

Figure 17:
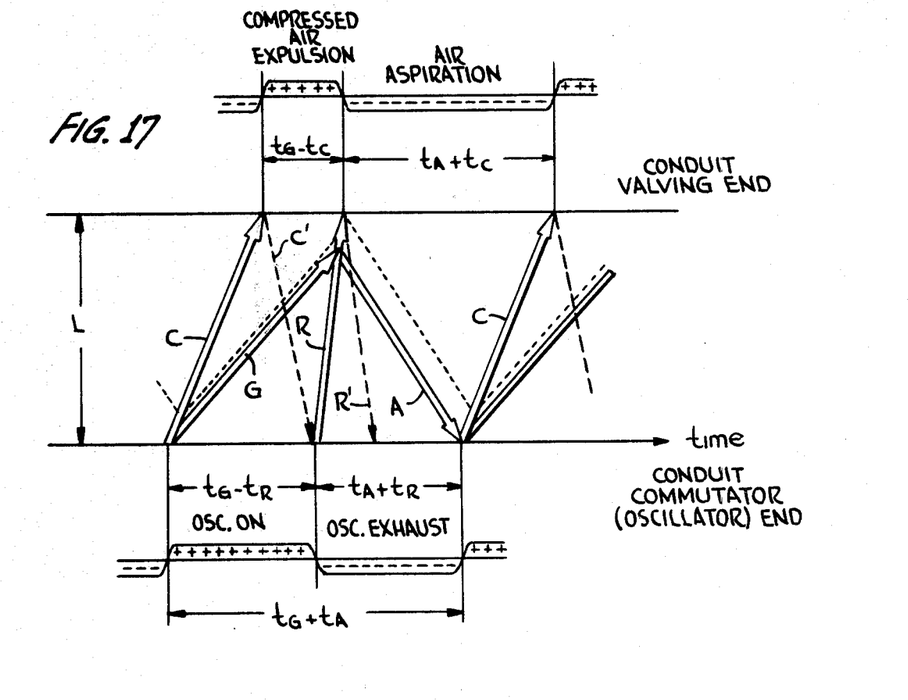

In the fifty percent oscillator duty cycle embodiment illustrated in FIG. 17 the gas flow G never reaches the end of the conduit because the rarefaction front R arrives first and, in passing the flowing air, causes the air in the conduit to reverse direction and flow back toward the oscillator. It can be seen that if the exhaust gas velocity is increased from this condition, the gas flow G can be made to reach the downstream end of the conduit before or at the same time as the rarefaction front R, thereby providing a longer air expulsion interval.

Figure 18:
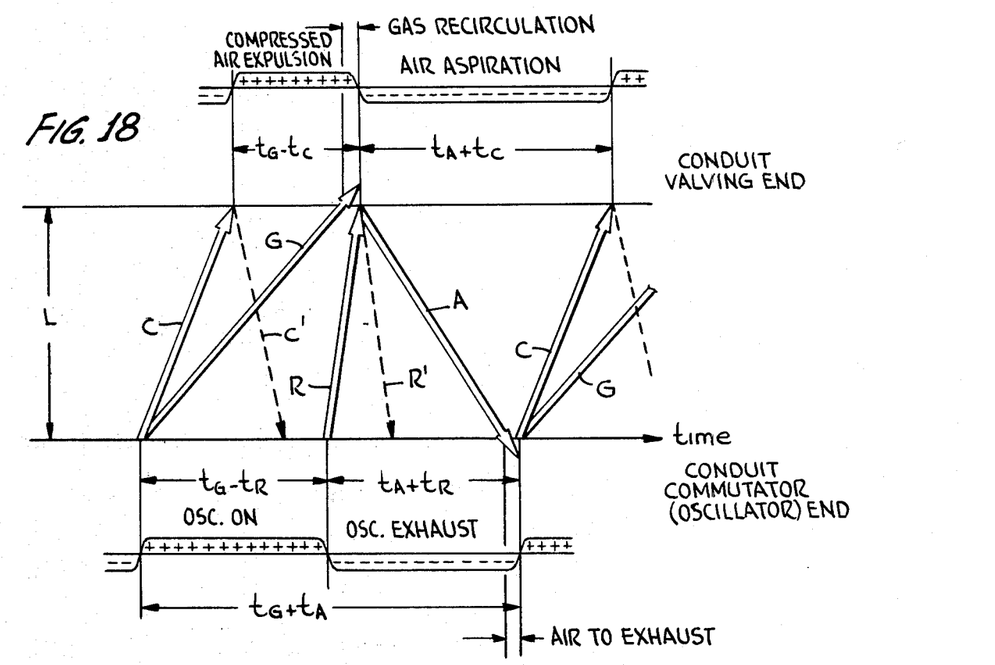

In FIG. 18 the oscillator frequency is selected to permit gas flow G to reach the downstream end of the energy exchange conduit before rarefaction wave R, thereby permitting some exhaust gas to enter the engine intake manifold. The interval during which exhaust gas enters the intake manifold is designated "gas recirculation" in FIG. 18 and may be lengthened or shortened by varying the exhaust gas velocity accordingly. One way of varying exhaust gas volocity, of course, is to change the engine operating speed under the control of the vehicle accelerator pedal.

With respect to the frequency of the oscillator or other commutator, it is desirable to maintain the frequency constant when the controlled engine operates under constant conditions such as constant RPM, constant load, constant air flow, constant ambient conditions, etc.. Where ambient conditions, loading, RPM and the like change over wide ranges, it is desirable to have the oscillator frequency adapt to these conditions to obtain optimum efficiency in spite of varying parameters and conditions. Thus, the fluidic oscillator employed as the commutator must be selected to meet the needs of the engine as it is to be utilized. Fluidic oscillators which operate at substantially constant frequency in spite of changing supply pressure are, on the one hand known. Likewise, fluidic oscillators which have variable frequency versus applied pressure characteristics are known.

The oscillation cycle frequency is given by:

$$f = \frac{1}{t_G + t_A} = \frac{1}{L} \cdot \frac{v_G \cdot v_A}{v_G v_A} \tag{3}$$

when, as in FIG. 15, an oscillation duty cycle of 50% is assumed, the following relationships result: $t_G - t_R = t_A + t_R$. Substituting velocities we obtain:

$$\frac{1}{v_G} - \frac{1}{v_A} = \frac{2}{C_G + v_G}. \tag{4}$$

In view of the fact that $v_A$ is comparatively more difficult to modify at will, since it depends on available aspiration and is more or less a constant value, we reduce this relationship to $$v_G^2 + v_G(C_G + v_A) - C_A v_A = 0, \tag{5}$$

and thus $$v_G = -\frac{C_G + v_A}{2} + \sqrt{\frac{(C_G + v_A)^2}{4} + C_a v_A} \tag{6}$$

Conditions for any other duty cycle, whether for the oscillator or for the air output, may be similarly resolved. For example, FIG. 16 shows the respective timing schematic when a 50% duty is assumed for the air aspiration/expulsion cycle. FIG. 17 indicates a situation when the oscillation frequency is increased, and FIG. 18 shows the results of frequency reductions (without changes in gas or air conditions). From these illustrations one can see qualitative results, for example gas recirculation.

Figure 3:
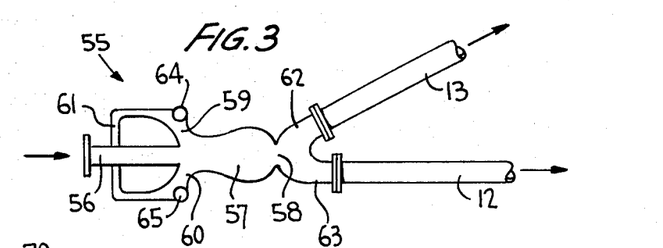
FIG. 3 is a schematic diagram of an alternative type of fluidic oscillator useful with the present invention.

Another oscillator which operates over a wider range of frequencies with changes in gas flow and which is suitable for use in place of oscillators 10 or 11 is illustrated in FIG. 3. This oscillator is described and illustrated in my co-pending U.S. patent application Ser. No. 19,250, filed Mar. 9, 1979 and entitled FLUIDIC OSCILLATOR WITH RESONANT INERTANCE AND DYNAMIC COMPLIANCE CIRCUIT. The oscillator 55 includes a power nozzle 56 which issues a jet of the applied pressurized fluid into interaction region 57. The sidewalls of the interaction region, instead of diverging downstream toward the outlet passages, instead initially diverge and then converge to from a single outlet opening 58. The transition between divergence and convergence is smooth so that flow of the jet along each sidewall is likewise smooth and not subject to pressure losses experienced at discontinuities of flow channels. The oscillator additionally includes opposed control ports 59 and 60 which are interconnected by passage 61. Ports 64 and 65 are provided in control ports 59 and 60, respectively, to permit frequency and phase synchronization of oscillator 55 with another oscillator. Downstream of outlet 58 there is a flow divider 66 which separates two outlet passages 62 and 63. Passage 62 forms part of exhaust channel 13; passage 63 forms part of the energy exchange conduit 12.

The operation of oscillator 55 is described in my aforesaid U.S. patent application Ser. No. 19,250, which application is incorporated herein by reference. Suffice it to say that a vortex is formed near the downstream end of chamber 57, which vortex alternately flows in opposite rotational directions to thereby alternately direct outflow into passages 62 and 63. The vortex also causes alternate aspiration and inflow of fluid from the control ports 59 and 60, thereby causing alternately reversing flow in passage 61 which acts as a fluid inertance. The delay of flow through the inertance in response to aspiration from a control port, combined with the build-up and reversal of the vortex, results in a resonant or tuned circuit wherein the vortex serves as a dynamic compliance. The oscillation frequency is thus determined by the inertance and compliance parameters.

Figure 4:
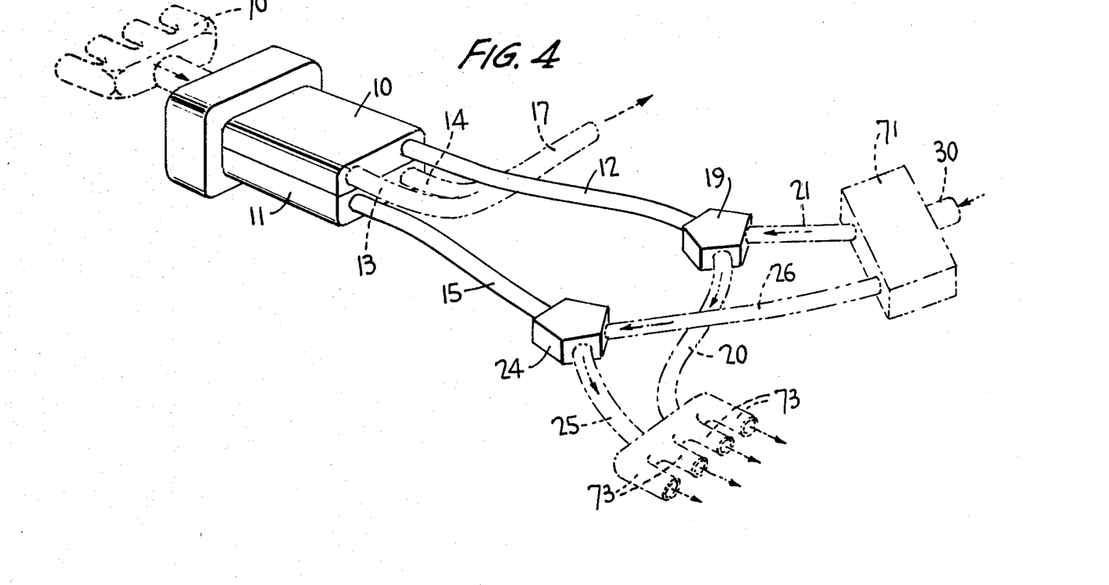
FIG. 4 is a schematic diagram of a supercharger system employing the energy exchanger of FIG. 1.

FIG. 4 is an illustration of how the energy exchanger of FIGS. 1 and 2 physically interconnects with an engine when serving as a supercharger. Commutators 10 and 11 are shown in suitable metal housings dispensed in side-by-side relation. The engine exhaust manifold 70 receives and combines the pressurized exhaust gas from the various engine cylinders and applies it to the two commutators in parallel. The exhaust passages 13 and 14 from the two commutators are combined into passage 17 which is connected to whatever exhaust pipe and/or exhaust silencing arrangement (not shown) is employed. The energy exchange conduits 12 and 15 are shown terminating at the respective bifurcations 19 and 24 which are shown as assemblies that include the various check valves. Ambient air is supplied to the assemblies 19, 24 via respective passages 21, 26 which receive the air from air inlet 30 via an air filter 71. The compressed air outlet passages 20, 25 terminate in the engine air inlet manifold 72 which distributes the air to the various cylinder air inlets 73.

Figure 5:
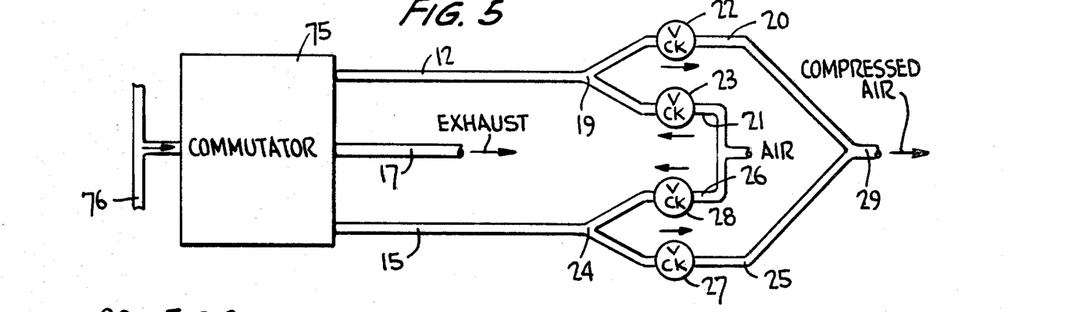
FIG. 5 is a block diagram of an alternative embodiment of the energy exchanger of the present invention.

FIG. 5 is a block diagram of another energy exchanger according to the present invention wherein the same principles apply but only a single commutator is required. Like components in FIGS. 1 and 5 bear the same reference numerals. The main difference between the two embodiments is that the single commutator 75 replaces the two commutators 10 and 11. Commutator 75 operates by directing a jet of the applied pressurized gas received from supply manifold 76 alternately to energy exchange conduit 12, single exhaust passage 17, energy exchange conduit 15, exhaust passage 17 and then back to conduit 12 to repeat the cycle. Operational sequence in each energy exchange conduit 12 and 15 is the same as described above; however, gas is exhausted from these conduits via the single exhaust outlet rather than via separate passages 13 and 14. A particular fluidic oscillator which performs the function required of commutator 75 is oscillator 80 illustrated in FIG. 6. Oscillator 80 is similar to oscillator 70 of FIG. 2 in that it has the power nozzle 31, interaction region 32, control ports 33, 34 and passage 35 interconnecting the control ports. Oscillator differs from oscillator 10 in that there are two flow dividers 81 and 82 at the downstream end of interaction region instead of the single divider in oscillator 10. The two dividers form three outlet passages 83, 84 and 85. Passage 83 is the upstream part of energy exchange conduit 12 and is formed between flow divider 81 and the extension of one sidewall of interaction region 32. Passage 35 is the upstream part of energy exchange conduit 15 and is formed between flow divider 82 and the extension of the opposite sidewall of the interaction region. Passage 84 is formed between the flow dividers 81 and 82.

Figure 6:
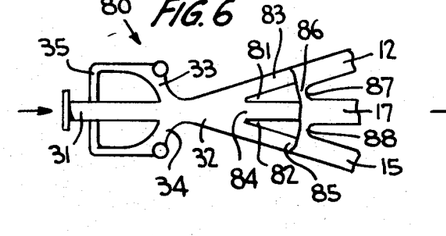
FIG. 6 is a schematic diagram of another fluidic oscillator arrangement useful in the present invention.

Oscillation of the jet in oscillator 80 proceeds in the same manner as described for oscillator 10. However, the cyclically swept jet is received by passages 83, 84, 85, 84 in repetitive sequence. Importantly, the jet dwells for longer periods of time in passages 83 and 85 than in passage 84, but when directed into passage 83 or 85 a portion of the jet is scooped off into the exhaust passage 84 and acts therein to aspirate fluid from the passage 85 or 83 which is not receiving the jet. As a slug of pressurized gas enters each of passages 83 and 85 it produces a pressure wave therein to effect compression of the air in conduits 12 and 15, respectively in the manner described above. Likewise, switching of the jet away from passage 83 or 85 creates a rarefaction wave in that passage which, as described above, functions along with the aspiration effect of the exhausting jet to flow the spent gas out of the energy exchange conduit and admit air therein at the downstream end through the check valves 23 and 28. The region 86 just downstream of the flow dividers is enlarged to facilitate aspiration in the manner suggested at region 46 of FIG. 2. Likewise, aspiration passage 87, interconnecting energy exchange conduit 12 and exhaust passage 17, and aspiration passage 88, interconnecting energy exchange conduit 15 and exhaust passage 17, are similar to aspiration passages 45 and 47 in that they facilitate aspiration of spent gas from the energy exchange conduits.

Figure 7:
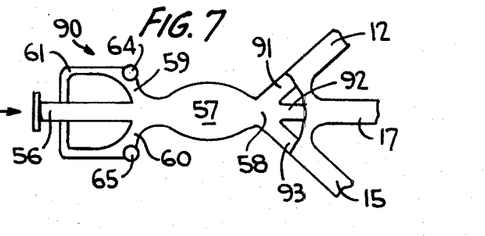
FIG. 7 is a schematic diagram of still another fluidic oscillator arrangement useful in the present invention.

The oscillator 90 illustrated in FIG. 7 is similar to oscillator 55 of FIG. 3 in that everything is identical except the number of outlet passages. Again, like components in FIGS. 3 and 7 bear the same reference numerals. The difference resides in the fact that three outlet passages 91, 92, 93 are provided for oscillator 90 whereas only two are provided for oscillator 55. Oscillator 90 is therefore suitable for use as the single commutator 75 in the energy exchanger of FIG. 5. Operation of oscillator 90 proceeds in the same manner as in oscillator 55. The swept jet is received sequentially by passages 91, 92, 93 and 92. Passages 91 and 93 are at the upstream ends of conduits 12 and 15, respectively, whereas passage 92 is at the upstream end of passage 17. Operation in conduits 12 and 15, and in conduit 17, proceeds in the same manner described in relation to FIG. 6.

It should be noted that oscillators 10 and 11 of FIG. 2 may be symmetrical or asymmetrical in construction. By symmetrical is meant that, considering a longitudinal centerline extending up and down stream, the oscillator is symmetrical about that centerline. In certain cases it is desirable to have assymmetry, as shown in oscillators 10 and 11 of FIG. 2 and oscillator 55 of FIG. 3, in order that pressure recovery be maximized in the energy exchange conduit but flow recovery be maximized for the exhaust conduit, thereby maximizing aspiration. More specifically, the outlet passages from the oscillator may be positioned so that one will receive more fluid than the other during each oscillator cycle, depending upon system requirements. In certain oscillators symmetry may be present; however, in these cases, compromises must be made between pressure recovery and flow recovery considerations. In any case, efficient use is made of the applied gas energy since, when directed into the energy exchange conduit the jet compresses the air therein, and when directed into the exhaust conduit it forcefully aspirates the spent gas from energy exchange conduit.

Figure 8:
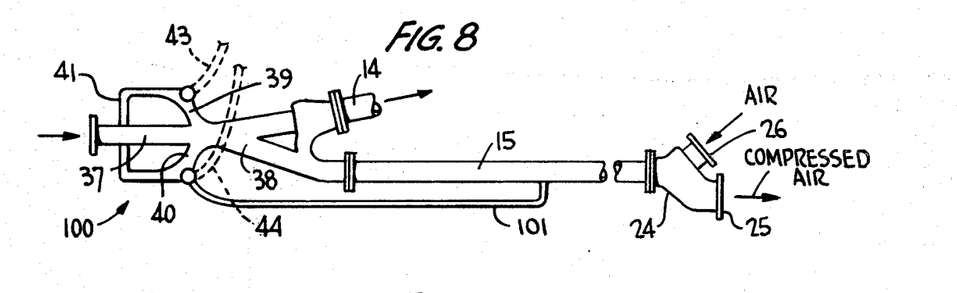
FIG. 8 is a schematic diagram of still another energy exchanger embodiment of the present invention.

The oscillator 100 of FIG. 8 is designed to replace oscillator 10 or 11 of FIG. 2. Oscillator 100 is similar to oscillator 11 and like components in FIGS. 2 and 8 bear the same reference numerals. The difference between the two oscillators resides in the presence of a feedback tube 101 extending from a point approximately at the middle of conduit 15 to control port 40. When the pressure wave, travelling along conduit 15 reaches the location of feedback tube 101, a pressure wave begins traversing tube 101 at sonic velocity. When this pressure wave reaches control port 40 it acts to deflect the jet back toward the exhaust passage 14. Depending upon the exact location of tube 101 in conduit 12, it can serve to cause deflection of the jet at a time earlier than the time at which the jet would normally be deflected over to the exhaust passage by the effects in passage 41. Under such circumstances the tube 101 serves as a duty cycle control whereby the dwell times of the jet in passage 14 and conduit 15 are unequal. Unequal dwell times may be desirable in certain applications and can, of course, be used to limit the amount of pressurized gas admitted into conduit 15, thereby making the task of exhausting the spent gas considerably easier. Alternatively, passage 41 may be eliminated and feedback tube 101 may be used as the oscillation-producing mechanism for the jet. This requires that the oscillator be asymmetrical such that the jet is not stable when deflected into passage 14; or, there must be a second feedback tube extending from a location along passage 14 to control port 39. In either case, the control ports would be closed off rather than interconnected by passage 41.

Figures 10, 12:
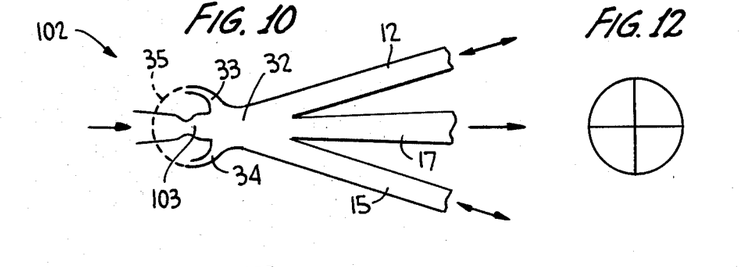
FIG. 10 is a schematic diagram of a further fluidic oscillator arrangement useful with the present invention.
FIG. 12 is a schematic representation of one form of cross-sectional configuration of an energy exchange conduit employed in the present invention.

The oscillator 102 of FIG. 10 is similar to oscillator 80 of FIG. 6 except that oscillator 102 employs a so-called supersonic or Laval nozzle 103 which provides smooth transitions and thereby minimizes pressure losses in the jet of pressurized gas.

Figure 11:
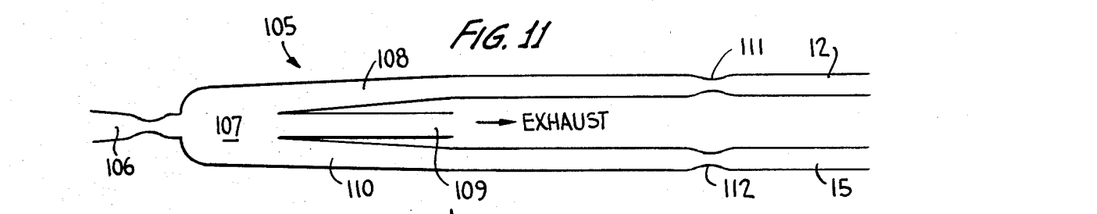
FIG. 11 is a schematic diagram of still another fluidic oscillator arrangement useful with the present invention.

A still further oscillator for use in place of oscillators 80 or 90 is oscillator 105 of FIG. 11. Oscillator 105 includes a supersonic power nozzle 106 which receives the pressurized gas and issues same into an interaction region 107. The downstream end of interaction region 107 is terminated by three outlet passages, 108, 109 and 110, with passage 109 subsisting between passages 108 and 110 and serving as an exhaust outlet. At some location along their lengths, each of passages 108 and 110 are provided with restrictions 111 and 112, respectively. Passages 108, 110 are the two energy exchange conduits 12 and 15, respectively. Passages 108 and 110 act as resonant tubes wherein restrictions 111 and 112 serve to reflect a small portion of the pressure waves in the tubes and establish a standing wave pattern therein. The reflected pressure waves in passage 108, for example, travel back upstream and, upon reaching interaction region 107, deflect the jet from that passage, across the exhaust passage, to passage 110. Pressure wave reflections in tube 110 also deflect the jet so that an oscillation is established at a frequency determined by the lengths of tubes 108 and 110. Since the pressure waves travel at sonic velocity, it is a simple matter to select the passage lengths which provide the desired frequency. The portion of the pressure waves not reflected by restrictions 111 and 112 pass into energy exchange conduits 12 and 15 to effect the operational sequence described above in relation to FIG. 9.

Figure 13:
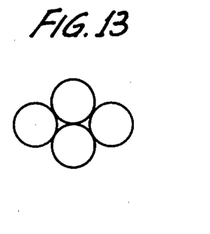
FIG. 13 is a schematic representation of another form of cross-sectional configuration of an energy exchange conduit employed in the present invention.

In some applications of the energy exchanger it may be necessary to have relatively large flow areas in energy exhaust conduits 12 and 15 to meet the flow requirements for the compressed air. However, conduits with large cross-section are conducive to mixing of the gas and air at interfaces of the gas slugs. In order to minimize the effect, the conduit may be sub-divided into plural separate conduits, as shown in FIG. 12, or plural individual tubes may be employed, as shown in FIG. 13. In either case, the total cross-sectional area of the conduit may be as desired to achieve the flow requirements.

Figure 14:
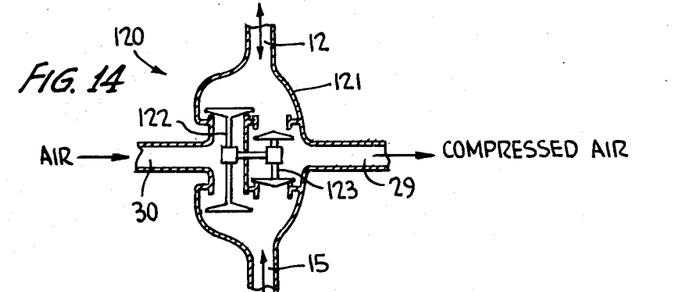
FIG. 14 is a schematic arrangement of an alternative shuttle valving arrangement useful in the present invention.

It should also be noted that the separate independent valves 22, 23, 27 and 28 of FIG. 2 or FIG. 5, may be replaced by the combined shuttle valving assembly 120 of FIG. 14. Valving assembly 120 permits conservation of space and minimization of tubing. More specifically, a housing 121 connects to each of the four conduits 12, 15, 29 and 30 of FIG. 2. For ease of reference these passages are shown spaced by 90° in FIG. 14 whereby conduits 12 and 15 are 180° spaced and passages 29 and 30 are 180° spaced; this is not a necessary positioning, however. A first shuttle valve 122 within housing 121 permits air inlet passage 30 to alternately communicate with conduits 12 and 15 depending on the pressure conditions in those conduits. When the pressure in conduit 12 is above ambient the pressure in conduit 15 is below ambient, because of the phase opposition in these conduits, and at this time, valve 122 is in the position shown wherein it provides communication between passage 30 and conduit 15 but blocks communication between passage 30 and conduit 12. Likewise, when pressure conditions reverse in conduits 12 and 15, the valve 122 shifts to block communication between air inlet 30 and conduit 15 but to permit air to flow from inlet 30 into conduit 12.

A second shuttle valve 123 permits compressed air outlet 29 to alternately be placed in communication with conduits 12 and 15. When the pressure in conduit 12 exceeds the pressure in conduit 15, the valve 123 is in the position shown wherein compressed air in conduit 12 is forced through outlet 29 whereas conduit 15 is blocked from outlet 29. On the other hand, a higher pressure in conduit 15 permits compressed air in that conduit to be passed to outlet 29 while blocking communication between conduit 12 and outlet 29.

Figure 19:
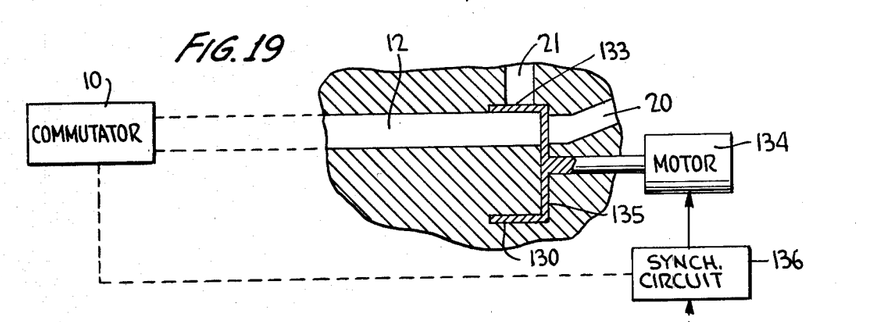
FIG. 19 is a schematic representation of a synchronized valving arrangement employed with the commutator in one embodiment of the present invention.
Figure 20:
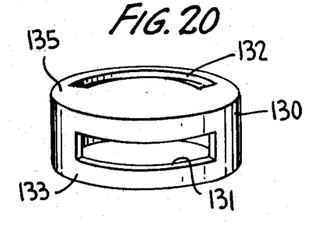
FIG. 20 is a perspective view of the valve employed in FIG. 19.

The valving may also be synchronized to the oscillator operating frequency so that the compression and rarefaction do not control valving operation. Such an embodiment is illustrated in FIG. 19 wherein commutator or oscillator 10 is shown schematically connected to energy exchange conduit 12 such as in the embodiment of FIG. 1. The downstream end of the conduit 12 includes entrances to passages 20, 21 which are oriented at right angles. A cup-like valve member 130 is positioned to be rotatable such that its cylindrical sidewall 133 passes in front of the entrance to passage 21 while an angular region of its base 135 passes in front of the entrance to passage 20. Valve member 130 is shown in greater detail in FIG. 20 and includes a slot 131 extending arcuately along the sidewall 133. Another arcuate slot 132 is defined along a portion of the annular region of base 135 which passes the entrance to passage 20. Thus, it will be seen that air inflow from passage 21 occurs when slot 131 is aligned with that passage and air outflow to passage 20 occurs when slot 132 is aligned with that passage. The angles subtended by slots 131, 132 are selected to provide the desired ratio of air outflow interval to air inflow interval and, of course, may be chosen to permit some degree of exhaust gas outflow to outlet passage 20 if desired. Rotation of valve member 130 about its longitudinal axis is effected by motor 134 which has its operating speed synchronized by synchronizer circuit 136. This synchronizer circuit, which is conventional in the art, also synchronizes the frequency of commutator 10.

Figure 21:
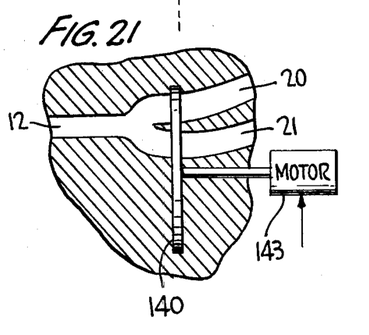
FIG. 21 is a schematic representation of another synchronized valving arrangement useful with the present invention.
Figure 22:
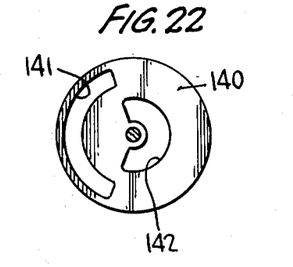
FIG. 22 is a plan view of the valve employed in the FIG. 21 arrangement.

An alternative valving embodiment is illustrated in FIGS. 21 and 22 wherein the cup-like configuration of the valving member is changed to a flat disc 140 having arcuate slots 141, 142 at different radial distances from its center. Passages 20, 21 are positioned such that the slots 141, 142, respectively pass their entrances at desired times when the disc is rotated about its center by motor 143. The motor may be synchronized in speed to the frequency of the commutator 10 as described. It should be noted that slots 131, 132 and 141, 142 may be a series of spaced slots of smaller lengths to permit double or triple frequency operation. Further, the disc 140 can serve more than two sets of passages 20, 21 as will readily be appreciated from FIG. 20.

Figure 23:
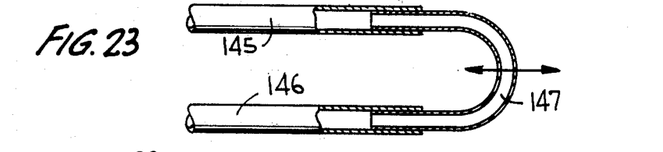
FIG. 23 is a schematic representation of how the energy exchange conduit length may be varied.

In addition to varying the oscillator frequency to achieve different desired operating condition per FIGS. 15-18, the length of the energy exchange conduit may be varied. One approach to varying the length of the conduit is illustrated in FIG. 23 wherein the conduit includes two straight sections 145, 146 jointly by a U-shaped section 147. Specifically, the U-shaped section 147 is telescoped into sections 145, 146 and movable therein so as to vary the length of the overall conduit. If the passage replaces passage 61 in FIG. 3, the frequency of oscillator 55 can also be adjusted accordingly.

Figures 24, 25, 26:
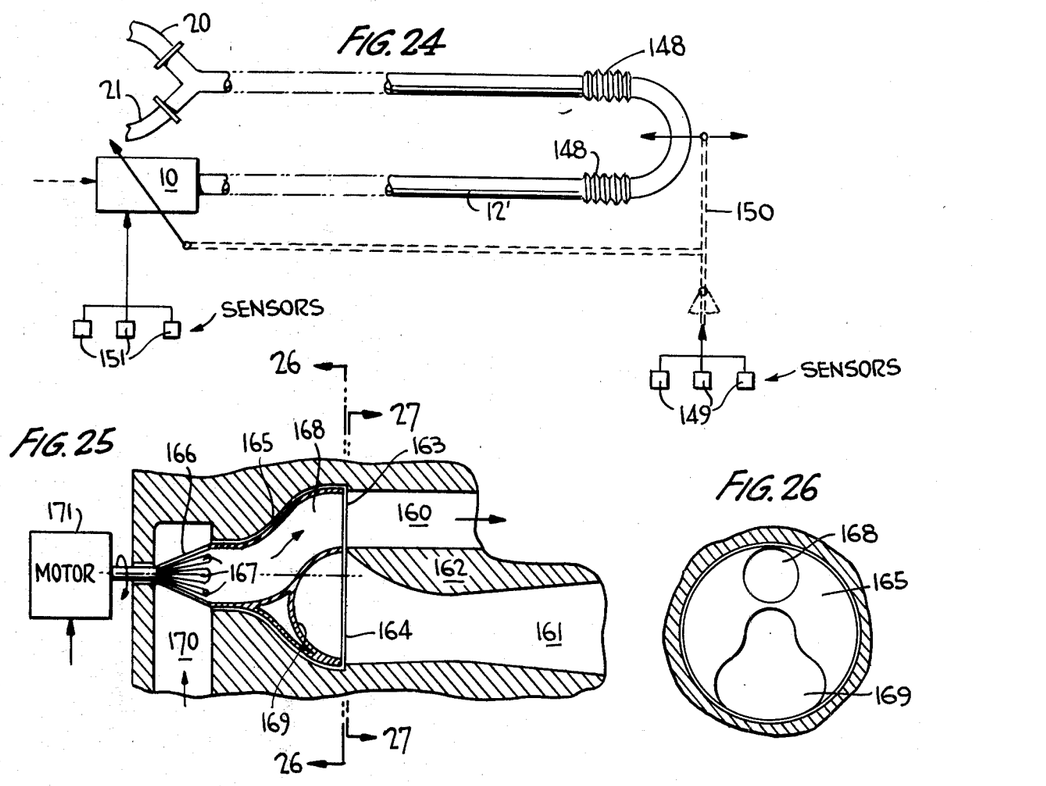
FIG. 24 is a schematic representation of how the energy exchange conduit length and commutator frequency may be controlled in synchronism in response to senses conditions.
FIG. 25 is a partially schematic plan view representation of a mechanical rotor arrangement employed as a commutator in one embodiment of the present invention.
FIG. 26 is a view in section taken along lines 26—26 of FIG. 25.

Variation of the conduit length, as described, can be made dependent upon sensed engine operating conditions to control the operation. An embodiment illustrating the feature is seen in FIG. 24. Specifically, the energy exchange conduit 12' is seen to include one or more expansible pleated portions which permit elongation or contraction of the conduit. A plurality of sensors 149 sense various engine parameters, such as engine temperature, ambient temperature, engine or ambient pressure, engine speed, humidity, etc., and control the length of conduit 12' by moving a linking mechanism generally indicated by numeral 150. This mechanism 150 can also be employed to control the frequency of commutator 10, such as by changing the length of passage 61 in FIG. 3, to synchronize frequency and conduit length variations. Alternatively, sensors 151 may be used to separately control the oscillator frequency.

The commutator in the embodiments described above is a fluidic oscillator. Another suitable commutator is illustrated in FIGS. 25, 26, 27 and 28. The energy exchange conduit is designated by reference numeral 160 and the exhaust passage by reference numeral 161. Conduit 160 and passage 161 are separated by a flow divider 162 positioned offset from the longitudinal axis of the device. The inlet 163 to conduit 160, partially defined by divider 162, is generally arcuate, subtending an angle of approximately 180° and tapering downstream gradually toward conduit 160 in a funnel-like configuration. The inlet section 164 of passage 161 is also arcuate and partially defined by flow divider 162 to form a downstream funnel-like configuration into passage 161. The inlet 164 for passage 161 is substantially wider than inlet 163.

A rotor 165, having an outer configuration much like a bell jar includes an inlet end in the form of a regular cone 166 having plural slots 167 defined therein. The base of cone 166 terminates in a curved cylindrical passage 168 having its inlet end on the longitudinal axis of the rotor 165 and its outlet end radially spaced from the longitudinal axis. The outlet end of rotor 165 also includes a downstream-facing cusp 169 of generally pear shaped cross-section and having its longitudinal center spaced 180° on the rotor from passage 168.

Conical section 166 of rotor 165 is positioned in a supply manifold 170 which directs pressurized exhaust gas into the rotor via slots 167. Motor 171 causes rotor 165 to revolve about its longitudinal axis.

Passage 168 has substantially the same diameter as conduit 160. When the downstream end of the rotor is positioned adjacent the inlet ends of conduit 160 and passage 161, passage 168 aligns with conduit 160 once during each revolution of rotor 165. That is not to say that fluid from passage 168 enters conduit 160 for the short alignment interval; rather, fluid from passage 168 enters the arcuate funnel-like inlet end 163 of conduit 160 during a large portion of the cycle, depending upon the arcuate length of inlet 163. During other portions of each rotor revolution supply passage 168 directs exhaust gas into the wider inlet 164 of exhaust passage 161.

Figures 27, 28:
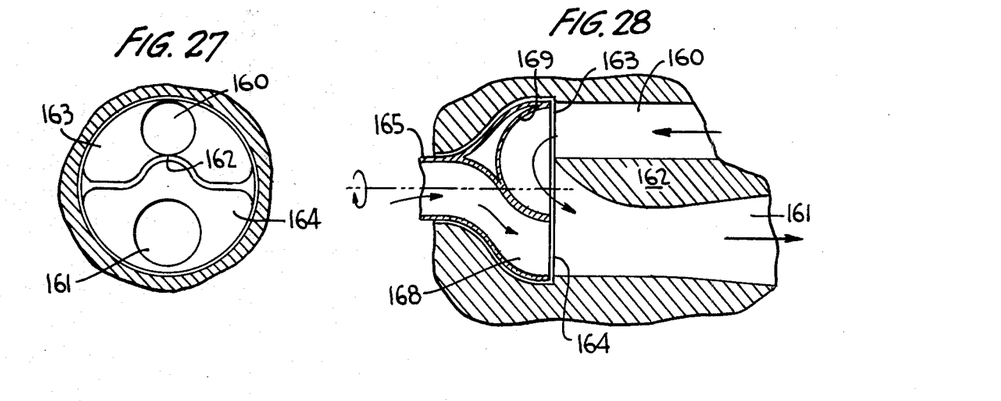
FIG. 27 is a view in section taken along lines 27—27 of FIG. 25.
FIG. 28 is a view similar to FIG. 25 showing the rotor in another position.

Cusp 169 serves to block exhaust gas flow into exhaust passage 161 when rotor supply passage 168 is aligned with conduit 160. This position is quite clearly illustrated in FIG. 25. When rotor supply passage 168 is aligned with the exhaust passage 161, as seen in FIG. 28, gas from the supply passage is directed into the exhaust passage and acts to aspirate gas from conduit 160 into the exhaust passage. This aspiration can take place because the cusp 169, in this position of the rotor, overlaps a portion of exhaust passage inlet 164, as well as conduit inlet 163. Therefore, the jet of exhaust gas entering exhaust passage 161 creates a low pressure region proximate cusp 169, thereby aspirating gas into the cusp from which it is redirected into the exhaust passage. The flow divier 162 is preferably contoured with a smooth airfoil surface to facilitate 180° reversal of flow of the aspirated gas from conduit 160 into passage 161.

Motor 171 controls the speed of the rotor and may be synchronized to the operation of the valves at the downstream end of the energy exchange conduit in the manner described above. Suitable bearings and fluid seals are, of course, contemplated as necessary to permit proper rotor rotation and pressure sealing.

The energy exchanger of the present invention has been described hereinabove primarily in terms of utilization as a supercharger for internal combustion engines. In such utilization, the applied pressurized gas is the engine exhaust, and the outflow from the exchanger is compressed air. It must be noted, however, that the energy exchanger has numerous other uses wherein other fluids may or may not be substituted for the engine exhaust and air. For example, the energy exchanger may be constructed to plug onto an exhaust pipe of an engine and employed as an air compressor to inflate tires, rafts, air mattresses, air tents, etc. In addition, the device may be operated by engine exhaust to provide a supply of heated air, the air being heated when compressed in the energy exchanger and may be additionally heated by passing the air outlet tube adjacent or through a heated medium such as the exhaust itself. Other uses include: air compression for soldering or brazing torches; pressure reduction for fuel gas recovered from wells, whereby the fuel gas, often at too high a pressure, can be reduced in pressure while compressing air which may be used safely to drive a turbine or the like; and conversion of high pressure geothermal steam or water to non-corrosive compressed air to operate corrosion-prone machinery.

As described with respect to the simplified schematic timing diagrams in FIGS. 15-18, the length of the energy exchange conduit is chosen with respect to commutation frequency and various propagation velocities (i.e. speed of sound and flows, depending on fluid properties and operating conditions such as temperature, pressure, etc.) such that optimal energy exchange is effected for the intended use. The conduit may be at least as long as to permit the pressure wave front C, as well as rarefaction front R, to propagate the entire conduit length during one commutation cycle. However, the combined effects of the waves and their reflections (including multiple reflections) in the respective dynamic flow regimes can well provide more optimal energy exchange for a variety of shorter and/or longer conduit lengths (at a given commutation frequency) than those lengths apparent from the simplified considerations used in FIGS. 15–18.

The energy exchanger of the present invention, by utilizing the combined effect of the rarefaction wave and aspiration of the conduit, permits efficient energy exchange between two fluids without requiring any rotating machinery, critical dimensional tolerances, or expensive materials. The use of various fluidic oscillators, such as those described for the diverters required herein provides the desired operating characteristics, although other diverters may be employed. Such diverters may be, and preferably are, self-cycling; that is, they alternately and cyclically divert the applied pressured gas into the energy exchange conduit and the exhaust passage solely under the control of the applied gas pressure and without the need for external power or control. Alternatively, external frequency control may be employed by techniques well known in fluidic technology whereby the jet is cyclically deflected by an externally supplied signal which keeps the deflection at the desired frequency. In addition, the cyclical diversion must create a pressure wave in the energy exchange conduit when the pressurized fluid is diverted into that conduit and must create a rarefaction wave in the conduit and when the fluid is diverted away from the conduit. Further, the diverter must be capable of aspirating the spent gas from the energy exchange conduit into the exhaust passage. Still further, the frequency of the cyclic diversion in the diverter must be relatively independent of flow and pressure in the applied pressurized gas over the range of pressures and flows to be applied to the diverter. Of course, some frequency variation with these parameters may be permitted as long as the rarefaction wave, as described herein, is capable of traversing the entire length of the energy exchange conduit at the desired time relative to the time the leading edge of the pressurized gas slug reaches the downstream end of that conduit to flow through the compressed air outlet. In this regard, any temperature changes in the pressurized gas which affect the sonic velocity of the rarefaction wave must similarly affect the operating frequency of the diverter so that the rarefaction wave passes the gas slug in the energy exchange conduit. The fluidic oscillators described herein include all of these characteristics.

Further, it is important to note that the applied pressurized fluid may be a liquid and that its pressure energy may be transferred to the second fluid which is a gas.

In summary, it should be noted that, relative to the prior art discussed hereinabove, the energy exchanger of the present invention has the following advantages: operation is independent of the number of cylinders of an engine for which the energy exchanger is used as a supercharger; the frequency range of the diverter permits pulse lengths to be matched to the energy exchange conduit length; valving is extremely simple, efficient and not very subject to wear; energy utilization efficiency is high since only one fluidic element is required in any series flow path; the amount of tubing and interconnections is minimized; no external timing and/or valving controls are required; no valves are required at the inlet end of the energy exchange conduit; a very large range of gas flow conditions can be accepted and produce proper operation, a characteristic which is important in supercharger applications wherein exhaust flow rates vary over a wide range; the presence of the applied fluid in the outflow fluid is avoided; by proper sizing of the energy exchange conduit and/or oscillator frequency, controlling mixing of the two fluids can be effected, particularly when it is desirable to feedback certain portions of the exhaust with the air intake to reduce nitrous oxide emissions in automotive engine (Exhaust Gas Recirculation); and there are no critical timing problems encountered during operation.

While I have described and illustrated specific embodiments of my invention, it will be clear that variations of the details of construction which are specifically illustrated and described may be resorted to without departing from the true spirit and scope of the invention as defined in the appended claims.

I claim:

1. Apparatus for transferring energy from a first fluid at relatively high pressure to a second gaseous fluid at relatively low pressure, said apparatus comprising:

an energy exchange conduit having an upstream end and a downstream end;

an exhaust passage;

an outflow passage;

an inflow passage;

first check valve means for controlling flow communication between said outflow passage and the downstream end of said conduit and permitting such flow communication only when the fluid pressure at the downstream end of said conduit exceeds the fluid pressure in said outflow passage by a predetermined amount;

second check valve means for controlling flow communication between said inflow passage and the downstream end of said conduit and permitting such communication only when the fluid pressure in said inflow passage exceeds the fluid pressure in the downstream end of said conduit by a predetermined pressure;

a source of said second fluid, at said relatively low pressure, connected to supply said second fluid to said inflow passage; and commutator means for receiving said first fluid at said relatively high pressure and distributing said first fluid as slugs directed alternately and repetitively into said exhaust passage and the upstream end of said conduit, said commutator means including:

means for establishing a pressure wave at the upstream end of said conduit when a slug of said first fluid enters said upstream end, which pressure wave traverses said conduit at sonic velocity plus the velocity of fluid flowing in said conduit;

means for establishing a rarefaction wave at the upstream end of said conduit when the first fluid is diverted therefrom into said exhaust passage; and aspiration means for aspirating fluid from the upstream end of said conduit into said exhaust passage by means of the flow of said first fluid into said exhaust passage;

whereby said pressure wave, in traversing said conduit, compresses second fluid therein, the second fluid being forced through said first check valve means into said outflow passage, and whereby said rarefaction wave, traversing said conduit, reverses the flow direction of said first fluid so that the first fluid flows toward said upstream end where it is aspirated into said exhaust passage by said aspiration means, said rarefaction wave additionally acting, upon reaching the downstream end of said conduit, to close said first check valve means to prevent outflow into said outflow passage and to open said second check valve means to permit entry of said second flow into said downstream end of said conduit.

2. The apparatus according to claim 1 further comprising:

a second energy exchange conduit, a second exhaust passage, a second commutator means, a second outflow passage, a second inflow passage and third and fourth check valve means;

wherein said second conduit, said second exhaust passage, said second commutator means, second outflow passage, second inflow passage, and third and fourth check valve means are substantially functionally identical to and interrelated to one another in the same manner as said energy exchange conduit, said exhaust passage, said commutator means, said outflow passage, said inflow passage, and said first and second check valve means, respectively;

means for synchronizing the operation of said commutator means and said second commutator means to the same frequency and substantially 180° phase opposition; and means for combining the outflows of second fluid from said outflow passage and said second outflow passage.

3. The apparatus according to claim 1 wherein said commutator means is a fluidic oscillator arranged to issue a cyclically deflected jet repetitively and sequentially into three outlet passages, one of said outlet passages corresponding to said energy exchange conduit, a second of said passages corresponding to said exhaust passage, and the third passage corresponding to a further energy exchange conduit which is substantially identical in structure and function to said energy exchange conduit, the upstream ends of said one and said third passages being disposed on opposite sides and adjacent to the upstream end of said second passage, said apparatus further comprising:

third check valve means for controlling flow communication between said outflow passage and the downstream end of said further conduit and permitting such flow communication only when the fluid pressure at the downstream end of said further conduit exceeds the fluid pressure in said outflow passage by a predetermined amount; and fourth check valve means for controlling flow communication between said inflow passage and the downstream end of said further conduit and permitting such communication only when the fluid pressure in said inflow passage exceeds the fluid pressure in the downstream end of said further conduit by a predetermined pressure.

4. The apparatus according to claim 1 or 2 wherein said commutator means is a fluidic oscillator of the type in which a jet of said first fluid is formed and cyclically deflected at a distribution frequency determined by sonic velocity in said first fluid in fluidic oscillator.

5. The apparatus according to claim 1 or 2 wherein said commutator means is a fluidic oscillator including:

an interaction region;

a nozzle for receiving said first fluid under pressure and issuing a jet thereof into said interaction region;

control means for cyclically deflecting said jet transversely of its flow direction; and first and second outlet passages arranged to alternately receive said cyclically deflected jet from said interaction region, said first outlet passage corresponding to said energy exchange conduit, said second outlet passage corresponding to said exhaust passage.

6. The apparatus according to claim 5 wherein said control means is self-contained within said fluidic oscillator and responds to the flow of fluid through said nozzle and said interaction region to establish a pressure differential of alternating polarity on opposite sides of said jet to provide the cyclical jet deflection.

7. The apparatus according to claim 6 wherein said control means comprises control passage means extending from one side of said jet to the other proximate the upstream end of said interaction at which said jet enters said interaction region, said control passage means conducting pressure waves at sonic velocity therethrough in alternate directions at said alternate distribution frequency to establish said alternating pressure differential across said jet.

8. The apparatus according to claim 6 wherein said control means includes feedback passage means communicating between said energy exchange conduit and said interaction region proximate one side of said jet to conduit a portion of said pressure wave in said energy exchange conduit back to deflect said jet.

9. The apparatus according to claim 6 wherein said control means comprises a flow restrictor defined in said energy exchange conduit, said restriction acting as a discontinuity to reflect a portion of said pressure wave back to said interaction region at sonic velocity to deflect said jet away from said conduit.

10. The apparatus according to claim 1 wherein said commutator means is a fluidic oscillator including:

an interaction region having upstream and downstream ends;

a nozzle for receiving said first fluid under pressure and issuing a jet thereof into the upstream end of said interaction region;

self-contained control means for cyclically deflecting said jet transversely of its flow direction in said interaction region at said alternate distribution frequency, said control means being responsive to the flow of said first fluid through said nozzle and interaction region to establish a pressure differential of alternating polarity on opposite sides of said jet to provide said cyclical jet deflection; and first, second and third outlet passages having side-by-side inlets at the downstream end of said interaction region for sequentially receiving said jet, said first outlet passage corresponding to said energy exchange conduit, said second outlet passage having its inlet disposed between and adjacent to the inlets of said first and third outlet passages and corresponding to said exhaust passage, said third outlet passage corresponding to a further energy exchange conduit having substantially the same length and functioning in substantially the same manner as said energy exchange conduit, said second outlet passage being positioned so as to receive a portion of said jet when said jet is directed into said first and third outlet passages.

11. The apparatus according to claim 10 further comprising:
third check valve means for controlling flow communication between said outflow passage and the downstream end of said further conduit and permitting such flow communication only when the fluid pressure at the downstream end of said further conduit exceeds the fluid pressure in said outflow passage by a predetermined amount; and
fourth check valve means for controlling flow communication between said inflow passage and the downstream end of said further conduit and permitting such communication only when the fluid pressure in said inflow passage exceeds the fluid pressure in the downstream end of said further conduit by a predetermined pressure.

12. The apparatus according to claim 1 further comprising means for operating said check valve means at a frequency synchronized with the frequency of repetitive distribution at said commutator means.

13. The apparatus according to claim 11 wherein said control means comprises feedback passage means from said conduit and said further conduit to said interaction region on respective side of said jet to conduct a portion of said pressure waves in said conduits back to deflect said jet.

14. The apparatus according to claim 6 wherein said control means comprises first and second flow restrictors in said first and third aoutlet passages, respectively, said restrictors acting as discontinuities to reflect a portion of pressure waves traversing the first and third outlet passages back to said interaction region at sonic velocity to deflect said jet away from the inlet to that outlet passage.

15. The apparatus according to claim 1 wherein said commutator means is a mechanical rotor having a rotating supply passage for delivering said slugs of said first fluid.

16. The apparatus according to claims 10, 11 or 12, wherein said nozzle is a supersonic nozzle.

17. Apparatus for pressurizing a second gaseous fluid with a first fluid in an energy exchange conduit into which slugs of said first fluid are successively directed from a fluidic oscillator and wherein the entry of the slug into the upstream end of said conduit establishes a pressure wave which traverses the conduit at sonic velocity and compresses second fluid in the conduit as the pressure wave travels by, said apparatus being characterized by:
an exhaust passage;
means for directing slugs of said first fluid into said exhaust passage in alternation with the slugs directed into said conduit at a substantially constant frequency;
means for establishing a rarefaction wave at the upstream end of said conduit upon termination of each slug of first fluid directed into said conduit, said rarefaction wave traversing said conduit at sonic velocity plus the velocity of first fluid in said conduit while reversing the flow direction of first fluid as it passes;
means at the downstream end of said conduit, responsive to said rarefaction wave reaching said downstream end, for admitting said second fluid into said conduit;
means at the downstream end of said conduit responsive to compression of said second fluid, for egressing said second fluid from said conduit; and
aspiration means for aspirating the reverse flowing first fluid in said conduit into slugs of first fluid flowing into said exhaust passage.

18. The apparatus according to claim 17 wherein said fluidic oscillator comprises:
an interaction region;
a nozzle for receiving said first fluid under pressure and issuing a jet thereof into said interaction region;
control means for cyclically deflecting said jet transversely of its flow direction in said interaction at said alternate distribution frequency; and
first and second outlet passages arranged to alternately receive said cyclically deflected jet from said interaction region, said first outlet passage corresponding to said energy exchange conduit, said second outlet passage corresponding to said exhaust passage.

19. The apparatus according to claim 18 wherein said control means is self-contained within said fluidic oscillator and responds to the flow of fluid through said nozzle and said interaction region to establish a pressure differential of alternating polarity on opposite sides of said jet to provide the cyclical jet deflection.

20. The apparatus according to claim 19 wherein said control means comprises control passage means extending from one side of said jet to the other proximate the upstream end of said interaction at which said jet enters said interaction region, said control passage means conducting pressure waves at sonic velocity therethrough in alternate directions to establish said alternating pressure differential across said jet.

21. The apparatus according to claim 19 wherein said control means includes feedback passage means communicating between said energy exchange conduit and said interaction region proximate one side of said jet to conduct a portion of said pressure wave in said energy exchange conduit back to deflect said jet.

22. The apparatus according to claim 19 wherein said control means comprises a flow restrictor defined in said energy exchange conduit, said restrictor acting as a discontinuity to reflect a portion of said pressure wave back to said interaction region at sonic velocity to deflect said jet away from said conduit.

23. The apparatus according to claim 17 wherein said fluidic oscillator comprises:
an interaction region having upstream and downstream ends;
a nozzle for receiving said first fluid under pressure and issuing a jet thereof into the upstream end of said interaction region;
self-contained control means for cyclically deflecting said jet transversely of its flow direction in said interaction region, said control means being responsive to the flow of said first fluid through said nozzle and interaction region to establish a pressure differential of alternate polarity on opposite sides of said jet to provide said cyclical jet deflection; and first, second and third outlet passages having side-by-side inlets at the downstream end of said interaction region for sequentially receiving said jet, said first outlet passage corresponding to said energy exchange conduit, said second outlet passage having its inlet disposed between and adjacent to the inlets of said first and third outlet passages and corresponding to said exhaust passage, said third outlet passage corresponding to a further energy exchange conduit having substantially the same length and functioning in substantially the same manner as said energy exchange conduit, said second outlet passage being positioned so as to receive a portion of said jet when said jet is directed into said first and third outlet passages.

24. The apparatus according to claim 23 further comprising:

means at the downstream end of said further conduit, responsive to a rarefaction wave reaching that downstream end, for admitting said second fluid into said conduit; and means at the downstream end of said conduit, responsive to a compression wave reaching that downstream end, for egressing said second fluid from said conduit.

25. The apparatus according to claim 24 wherein said control means comprises control passage means extending from one side of said jet to the other proximate the upstream end of said interaction at which said jet enters said interaction region, said control passage means conducting pressure waves at sonic velocity therethrough in alternate directions to establish said alternating pressure differential across said jet.

26. The apparatus according to claim 24 wherein said control means comprises feedback passage means from said conduit and said further conduit to said interaction region on respective side of said jet to conduct a portion of said pressure waves in said conduits back to deflect said jet.

27. The apparatus according to claim 19 wherein said control means comprises first and second flow restrictors in said first and third outlet passages, respectively, said restrictors acting as discontinuities to reflect a portion of pressure waves traversing the first and third outlet passages back to said interaction region at sonic velocity to deflect said jet away from the inlet to that outlet passage.

28. The method of pressurizing a second gaseous fluid with a first fluid in an energy exchange conduit, said method comprising the steps of:

(a) directing a jet of said first fluid into the upstream end of said conduit and thereby creating a pressure wave which traverses said conduit at sonic velocity to compress second fluid in said conduit and open a first check valve which permits the compressed second fluid to egress from the downstream end of said conduit;

(b) diverting said jet of first fluid away from said conduit and into an exhaust passage and thereby creating a rarefaction wave which traverses said conduit at sonic velocity plus the velocity of said first fluid in said conduit, said rarefaction wave reversing the flow direction of first fluid it passes in the conduit so that the first fluid flows toward the upstream end of the conduit, said rarefaction wave further closing said first check valve while opening a second check valve to permit entry of said second fluid into the downstream end of said conduit;

(c) aspirating said first fluid from the upstream end of said conduit by means of the jet of first fluid directed into said exhaust passage, whereby said second fluid which enters the downstream end of said conduit flows into said conduit to replace the aspirated first fluid; and (d) cyclically repeating steps (a), (b) and (c).

29. The method according to claim 28 wherein step (d) is established by a fluidic oscillator which responds totally to the pressure of the first fluid to establish said jet and cyclically deflect said jet by establishing a pressure differential of alternating polarity on opposite sides of the jet.

30. The apparatus according to claim 11 further comprising means for operating said check valve means at a frequency synchronized with the frequency of repetitive distribution at said commutator means.

* * * * *